United States Patent
Germain et al.

(10) Patent No.: US 11,080,648 B2
(45) Date of Patent: Aug. 3, 2021

(54) ORDER MANAGEMENT SYSTEM WITH RECOVERY CAPABILITIES

(71) Applicant: Charter Communications Operating, LLC, St. Louis, MO (US)

(72) Inventors: Timothy P. Germain, Morrison, CO (US); Faiz Ali, Ballwin, MO (US); Michael A. Brown, Grantham, NH (US)

(73) Assignee: Charter Communications Operating, LLC, St. Louis, MO (US)

( * ) Notice: Subject to any disclaimer, the term of this patent is extended or adjusted under 35 U.S.C. 154(b) by 557 days.

(21) Appl. No.: 15/648,783

(22) Filed: Jul. 13, 2017

(65) Prior Publication Data

US 2019/0019138 A1    Jan. 17, 2019

(51) Int. Cl.
*G06Q 30/00* (2012.01)
*G06Q 10/08* (2012.01)
(Continued)

(52) U.S. Cl.
CPC ....... *G06Q 10/087* (2013.01); *G06F 11/1435* (2013.01); *G06F 11/1451* (2013.01);
(Continued)

(58) Field of Classification Search
CPC .............. G06Q 10/087; G06Q 30/0635; G06F 11/1435; G06F 11/1456; G06F 11/1451;
(Continued)

(56) References Cited

U.S. PATENT DOCUMENTS

| 7,694,166 B1* | 4/2010 | Suggs | G06F 11/2025 709/211 |
| 8,812,895 B2* | 8/2014 | Shafiee | G06F 9/4856 714/4.11 |

(Continued)

OTHER PUBLICATIONS

"Data center topologies for mission-critical business systems," Cocchiara, R; Davis, H; Kinnaird, D. IBM Systems Journal 47.4: 695-706. International Business Machines Corporation. (Oct.-Dec. 2008); Dialog #222426368, 8pgs. (Year: 2008).*

(Continued)

*Primary Examiner* — Robert M Pond
(74) *Attorney, Agent, or Firm* — Armis IP Law, LLC

(57) ABSTRACT

A data recovery system (apparatus) includes first management hardware at a first location and second management hardware at a second location. The first management hardware includes or executes a corresponding primary order manager to process first orders. The second management hardware includes or executes a primary manager to process second orders. Each of the first management hardware and the second management hardware includes auxiliary resources to execute functions on behalf of each other in the event of a failure. For example, the first management hardware executes an auxiliary order manager to process the second orders during conditions in which the primary order manager of the second management hardware is unable to process the second orders; the second management hardware executes an auxiliary order manager to process the first orders during conditions in which the primary order manager of the first management hardware is unable to process the first orders.

22 Claims, 10 Drawing Sheets

(51) Int. Cl.
*G06F 11/14* (2006.01)
*G06Q 30/06* (2012.01)
*G06F 11/20* (2006.01)
*G06F 11/16* (2006.01)

(52) U.S. Cl.
CPC ...... *G06F 11/1456* (2013.01); *G06F 11/2023* (2013.01); *G06F 11/2038* (2013.01); *G06F 11/2097* (2013.01); *G06Q 30/0635* (2013.01); *G06F 11/1658* (2013.01); *G06F 11/2048* (2013.01); *G06F 2201/84* (2013.01)

(58) Field of Classification Search
CPC ............. G06F 11/2023; G06F 11/2038; G06F 11/2097; G06F 11/1658; G06F 11/2048; G06F 2201/84
USPC ...................................................... 705/26, 27
See application file for complete search history.

(56) References Cited

U.S. PATENT DOCUMENTS

| | | | | |
|---|---|---|---|---|
| 8,904,231 B2* | 12/2014 | Coatney | ............. | G06F 11/2023 714/4.11 |
| 2002/0163910 A1* | 11/2002 | Wisner | ................ | H04L 41/0681 370/389 |
| 2013/0132764 A1* | 5/2013 | Shafiee | ............... | G06F 11/2025 714/4.11 |
| 2013/0315382 A1* | 11/2013 | Liberman | ........... | G06F 11/2025 379/1.02 |
| 2017/0193070 A1* | 7/2017 | Miller | .................... | G06F 16/27 |

OTHER PUBLICATIONS

"From high availability and disaster recovery to business continuity solutions," Lumpp, Th; Schneider, J; Holtz, J; Mueller, M; Lenz, N; et al. IBM Systems Journal 47.4: 605-619. International Business Machines Corporation. (Oct.-Dec. 2008); Dialog #222427857, 13pgs. (Year: 2008).*

Synchronoss Technologies Applies for Patent on System and Method for a Distributed Replication Lock for Active-Active Geo-Redundant Systems Global IP News. Security & Protection Patent News [New Delhi] Jul. 7, 2017; Dialog #1916803180, 2pgs . (Year: 2017).*

* cited by examiner

US 11,080,648 B2

ORDER MANAGEMENT SYSTEM WITH RECOVERY CAPABILITIES

BACKGROUND

Conventional techniques include many different types of disaster recovery. For example, disaster recovery can include so-called cold data recovery sites, warm data recovery sites, and hot (ACTIVE) data recovery sites. Each of these types of recovery sites affords varying degrees of recovery from a disaster.

More specifically, at so-called cold data recovery sites, there is little or no hardware/software set up to take over when a disaster occurs. After a disaster, it typically takes a long time to get the respective cold recovery site back online again.

Warm disaster recovery sites refer to sites in which hardware and network connections are established from a first site to a second site, but which do not provide identical capabilities. In such an instance, disaster recovery can be delayed while respective data is retrieved from a remote backup site.

A hot (ACTIVE) disaster recovery site is one in which a complete copy of a production site, including personnel, network systems, power grids provide almost instant backups of your data. Typically, there is very minimal downtime when moving from the host site to the backup site.

In certain instances, a site may not have disaster recovery capability at all. In which case, it is even more difficult to get a site back up and running after a failure.

BRIEF DESCRIPTION OF EMBODIMENTS

Embodiments herein provide novel ways of providing enhanced disaster recovery.

More specifically, in one embodiment, a data recovery system (apparatus, software, etc.) includes first management hardware and second management hardware. The first management hardware includes or executes a corresponding primary order manager to process first orders (such as received from a first entity). The second management hardware includes or executes a primary order manager to process second orders (such as received from a second entity).

In one embodiment, the first management hardware is part of a first data center located at a first geographical location (such as in a first building); the second management hardware is part of a second data center located at a second geographical location (such as network address second building); the second location is disparately located with respect to the first geographical location. Accordingly, a failure at one location may not have any affect on the other location.

In accordance with further embodiments, each of the first management hardware and the second management hardware includes auxiliary resources to execute functions on behalf of the other management hardware in the event of a failure. For example, during conditions in which the primary order manager of the second management hardware (or corresponding primary order manager) is unable to process the second orders, the first management hardware executes an auxiliary order manager (on behalf of the primary manager of the second management hardware) to process the second orders.

Additionally, in one embodiment, during conditions in which the primary order manager (or any other resource) of the first management hardware is unable to process the first orders, the second management hardware executes an auxiliary order manager to alternatively process the first orders.

In accordance with still further embodiments, the first management hardware executes an order flow manager. The order flow manager receives both the first orders and the second orders. The order flow manager forwards the received first orders and received second orders to an appropriate platform for processing. For example, during conditions in which the primary order manager of the first management hardware is able to process the first set of orders and the primary order manager of the second management hardware is able to process the second set of orders, the order flow manager: i) forwards the first orders (such as orders from a first vendor) to the primary order manager of the first management hardware for execution; and ii) forwards the second set of orders to the primary order manager of the second management hardware for execution.

In the event that the second management hardware or corresponding primary order manager is unable to process the second orders, the order flow manager reroutes the second orders. For example, instead of forwarding the second orders to the primary order manager of the second management hardware when the primary order manager of the second management hardware is down (inoperable), the order flow manager forwards the second orders to an auxiliary manager of the first management hardware. In one embodiment, the first management hardware includes resources to execute the second orders on behalf of the second management hardware during a failure condition of the second management hardware. Similarly, the second management hardware includes an auxiliary manager to execute the first orders on behalf of the first management hardware during a failure of the first management hardware.

Note that the first orders, second orders, etc., can be forwarded based on any criteria (such as source information of a computer generating the order, destination information indicating a target system to which the order pertains, account information indicating an account of a subscriber to which the order pertains, etc.

In one embodiment, the order flow manager (or order flow gateway) is operable to analyze a respective order payload of each of multiple received orders from different entities. The order flow manager: i) forwards the first orders (such as orders originating or received from a first vendor) to a primary order manager of the first management hardware for execution, and ii) forwards the second orders (such as orders originating or received from a second vendor) to a primary order manager of the second management hardware for execution.

In accordance with further embodiments, as previously discussed, the first management hardware and second management hardware are operable to provide data backup for each other. More specifically, in one embodiment, the first management hardware includes a primary repository and an auxiliary repository. The second management hardware includes a primary repository and an auxiliary repository as well. The auxiliary repository of the first management hardware is operable to store a copy of order data stored in the primary repository of the second management hardware as first backup order data; the auxiliary repository of the second management hardware is operable to store a copy of order data stored in the primary repository of the first management hardware as second backup order data.

Embodiments herein can further include a first data synchronizer and a second data synchronizer. In one embodiment, as its name suggests, the first data synchronizer is operable to copy the first backup order data to the primary repository of the second management hardware in response to detecting that the second management hardware becomes operable again after a failure. The second data synchronizer resource is operable to copy the second backup order data to the primary repository of the first management hardware in response to detecting that the first management hardware becomes operable again after a failure. Accordingly, the synchronizer resources restore order data after a failure.

In accordance with yet further embodiments, the auxiliary repository of the first management hardware is operable to, in addition to storing a backup copy of order data stored in the primary repository of the second management hardware, store a backup copy of the order data stored in a primary repository of the first management hardware. The auxiliary repository of the second management hardware is operable to, in addition to storing a backup copy of order data stored in a primary repository of the first management hardware, store a backup copy of the order data stored in a primary repository of the second management hardware. Accordingly, the auxiliary repository of the first management hardware can be configured to store a backup copy of its own data as well as data from the second management hardware; the auxiliary repository of the second management hardware can be configured to store a backup copy of its own data as well as data from the second management hardware.

These and other more specific additional embodiments are disclosed herein as further discussed below.

Any of the resources as discussed herein can include one or more computerized devices, storage devices, mobile communication devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. Any of the resources as discussed herein can be operated to execute one or more software program to perform respective functionality as discussed herein. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium, computer logic, and/or system having instructions stored thereon to facilitate management of order information as discussed herein. The instructions, when executed by computer processor hardware, cause the computer processor hardware (such as one or more processor devices) to: execute a primary order manager in first management hardware to process first orders (such as received from a first entity), the first management hardware disposed at a first geographical location; execute a primary order manager in second management hardware to process second orders (such as received from a second entity), the second management hardware disposed at a second geographical location; and activate an auxiliary order manager in the first management hardware to process the second orders during conditions in which the primary order manager of the second management hardware is offline and/or unable to process the second orders received from the second entity.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of managing and fulfilling orders. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
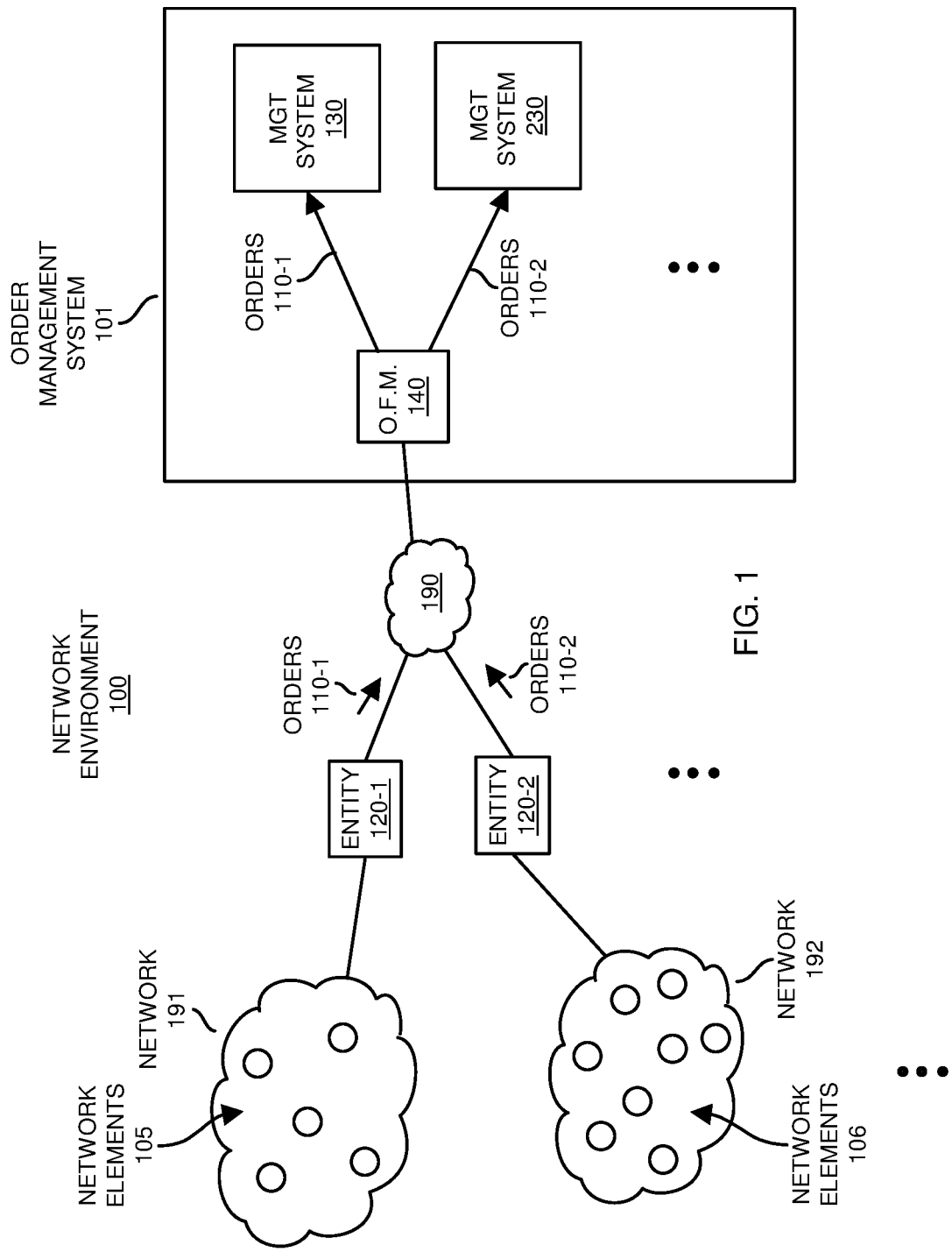
FIG. 1 is an example diagram illustrating a redundant order management system operating in a network environment according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

As previously discussed, in one embodiment, a data recovery system (apparatus) includes first management hardware and second management hardware. The first management hardware includes or executes a corresponding primary order manager to process first orders (such as received from a first vendor entity). The second management hardware includes or executes a primary order manager to process second orders (such as received from a second vendor entity).

In one embodiment, the first management hardware is part of a first data center located at a first geographical location; the second management hardware is part of a second data center located at a second geographical location; the first data center is disparately located with respect to the second data center.

In accordance with further embodiments, each of the first management hardware and the second management hardware includes auxiliary resources to execute functions on behalf of the other management hardware in the event of a failure. For example, the first management hardware executes an auxiliary order manager in a backup mode to process the second orders during conditions in which the primary order manager or any corresponding resources of the second management hardware are unable to process the second orders on behalf of the second management hardware. Additionally, during conditions in which the primary order manager or any corresponding resources of the first management hardware are unable to process the first orders, the second management hardware executes an auxiliary order manager in a backup mode to process the first orders on behalf of the first management hardware.

Now, more specifically, FIG. 1 is an example diagram illustrating an order management system operating in a network environment according to embodiments herein.

As shown, entity 120-1 (a first vendor) manages one or more order management functions such as distribution, delivery, billing, etc., of applications, services, resources, hardware, software, etc., with respect to network elements 105 disposed in network 191.

Entity 120-2 (a second vendor) manages one or more order management functions such as distribution, delivery, billing, etc., of applications, services, resources, hardware, software, etc., with respect to network elements 106 disposed in network 192.

As further shown, entity 120-1 generates orders 110-1 and transmits them over a respective network 190 to the (online) order management system 101; entity 120-2 generates orders 110-2 and transmits them over a respective network to the (online) order management system 101.

Accordingly, the order management system 101 received orders from multiple different entities.

In general, as its name suggests, the order management system 101 processes and manages the orders 110-1 received from entity 120-1 and orders 110-2 received from entity 120-2. Note that the network environment 100 can include any number of entities to take orders from corresponding network elements in corresponding networks.

In this example embodiment, order management system 101 includes order flow manager 140. As its name suggests, the order flow manager 140 manages a flow of orders 110 (orders 110-1 and orders 110-2) to a respective management system. For example, the order flow manager 140 receives orders 110-1 (originated or generated by the entity 120-1) and forwards them to the management system 130 of order management system 101. In a similar manner, the order flow manager 140 receives the orders 110-2 (originated or generated by the entity 120-2) and forwards them to the management system 230.

Note that the order flow manager 140 can be configured to identify a destination in which to forward each of the orders 110-1 and orders 110-2 (collectively, orders 110) in any suitable manner. For example, data in a respective order can indicate to which management system the order is directed. In one embodiment, the order flow manager 140 forwards each of the respective first orders 110-1 and the second orders 110-2 based on corresponding account information to which each respective order pertains.

As further discussed herein, the management system 130 and the management system 230 of order management system 101 can be disposed at different geographical locations such that a single catastrophic failure in a geographical region does not disable both management system 130 and management system 230 at the same time.

As discussed herein, the management system 130 provides backup-processing capability to process orders 110-2 in the event that the management system 230 experiences a respective failure. Likewise, the management system 230 provides backup-processing capability to process orders 110-1 in the event that the management system 130 experiences a respective failure. Accordingly, the order management system 101 provides continued order processing even during a respective failure.

Figure 2:
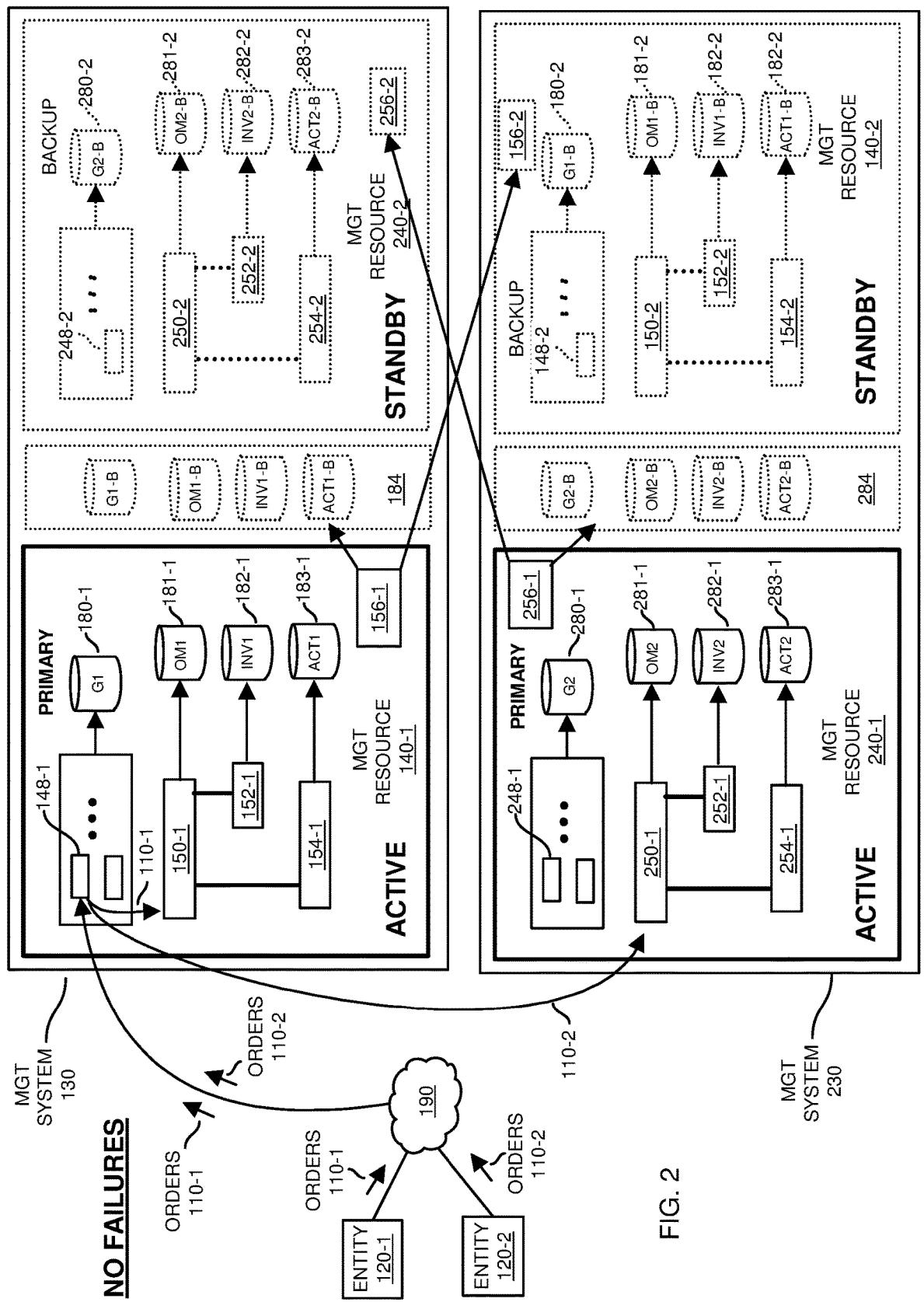
FIG. 2 is an example diagram illustrating details of a redundant order management system operating in a normal operational mode according to embodiments herein.

FIG. 2 is an example diagram illustrating details of a redundant order management system operating in a normal mode according to embodiments herein.

As shown, management system 130 in a first geographical location includes management resource 140-1 and (backup) management resource 240-2. Management system 230 includes management resource 240-1 and (backup) management resource 140-2.

Management resource 140-2 serves as a backup system with respect to management resource 140-1. That is, when there is a failure with respect to one or more functions provided by the management resource 140-1, the management resource 140-2 switches from a STANDBY mode to an ACTIVE mode to handle processing of respective orders 110-1.

Similarly, management resource 240-2 serves as a backup system with respect to management resource 240-1. When a failure is detected with respect to one or more functions (primary order manager, inventory management resource, activation management resource, etc.) provided by the management resource 240-1, the management resource 240-2 switches from a STANDBY mode to an ACTIVE mode to handle processing of respective orders 110-2.

Further in this example embodiment, assume that there are no failures associated with management system 130 or management system 230. In such an instance, each of management resource 140-1 and management resource 240-1 both operate in an ACTIVE mode while management resource 240-2 and management resource 140-2 operate in a backup STANDBY mode. When in the STANDBY mode, each respective management resource waits to receive notification indicating to switch to an ACTIVE state, in which case the respective management resource takes over processing of a corresponding failed management resource.

Assume that the order flow manager 148-1 disposed in management resource 140-1 has been assigned to receive orders from both entity 120-1 and entity 120-2. In such an instance, entity 121 and entity 122 transmit respective orders 110-1 and orders 110-2 over network 190 (such as one or more resources including the Internet, local area networks, phone links, etc) to the order flow manager 148-1. Network 190 conveys the orders 110 to the order flow manager 148-1 executed by the management resource 140-1. Accordingly, the order flow manager 148-1 receives the orders 110-1 and orders 110-2.

Note that the first orders 110-1, second orders 110-2, etc., can be forwarded based on any criteria (such as source information of a computer generating the order, destination information indicating a target system to which the respective order pertains, account information indicating an account of a subscriber to which the order pertains, etc.

In one embodiment, the order flow manager 148-1 (or order flow gateway) is operable to analyze a respective order payload of each of multiple received orders 110 from different entities 120. The management resource 140-1 includes repository 180-1 to store data G1 (in a respective database, file system, etc.) associated with the order flow manager 148-1 and related functions.

As further shown, the order flow manager 148-1 forwards orders 110-1 to the primary order manager 150-1 executed by the management resource 140-1; order flow manager 148-1 forwards orders 110-2 to the primary order manager 250-1 executed by the management resource 240-1.

Because the management resource 140-1 (such as at a first data center) and management resource 240-1 (such as at a second data center) are located at disparate locations (such as in different buildings, different cities different states, etc.), the orders 110-1 are handled by hardware and corresponding executed software (first data center) at a first geographical location; the orders 110-2 are handled by hardware and corresponding executed software (second data center) at a second geographical location.

Upon receipt, the primary order manager 150-1 processes each of the received orders 110-1. The primary order manager 150-1 stores any data (such as the order itself and/or supplemental data) associated with processing of the orders 110-1 as OM1 data in a respective data structure (such as database, file system, etc.) of repository 181-1.

In one embodiment, each of the orders 110 specifies information such as specific products and/or services purchased by a subscriber, bill information with respect to such purchases or subscriptions, corresponding subscriber account information to which the order applies, network element to which the order pertains, etc.

As further shown, in addition to receiving forwarded orders 110-1, the primary order manager 150-1 is in communication with both inventory management resource 152-1 and activation management resource 154-1 to fulfill the respective orders or perform one or more other operations such as billing.

As its name suggests, the inventory management resource 152-1 receives commands associated with the orders 110-1 from the primary order manager 150-1. In accordance with the commands, and orders 110-1, the inventory management resource 152-1 keeps track of information such as identities of the products and/or services purchased by each respective subscriber in network environment 100 and stores it in repository 182-1.

In one embodiment, network 191 and network 192 are part of a cable network environment in which subscribers purchase products and/or services such as Internet access services, cable television services, phone services, etc. In such an instance, inventory management resource 152-1 stores inventory information associated with the orders 110-1 (such as services and/or products purchased with respect to network elements 105) in repository 182-1.

As previously discussed, the primary order manager 150-1 is also in communication with the activation management resource 154-1. In accordance with input from the primary order manager 150-1, the activation management resource 154-1 manages activation of the services, products, etc., associated with the received orders 110-1.

In one embodiment, the activation management resource 154-1 executes any appropriate commands needed to activate services and/or products purchased by respective subscribers (operating network elements 105) as specified by the orders. The activation management resource 154-1 stores information (such as ACT1) associated with the activation in a respective data structure (such as database, file system, etc.) of repository 183-1.

In this manner, the management resource 140-1 manages order 110-1 received from entity 120-1.

When in an ACTIVE mode, the management resource 240-1 operates in a similar manner as management resource 140-1 as previously discussed.

For example, the primary order manager 250-1 receives orders 110-2 from order flow manager 148-1. The primary order manager 250-1 stores any data (such as the order itself and/or supplemental data) associated with processing of the orders 110-2 in a respective data structure (such as database, file system, etc.) of repository 281-1 as OM2 data.

As previously discussed, in one embodiment, each of the orders 110 specifies order information such as specific products and/or services purchased by a subscriber, bill information with respect to such purchases or subscriptions, corresponding subscriber account information to which the order applies, network element to which the order pertains, etc.

As further shown, in addition to receiving forwarded orders 110-2, the primary order manager 250-1 is in communication with inventory management resource 252-1 and activation management resource 254-1.

As its name suggests, the inventory management resource 252-1 receives commands associated with the orders 110-2 from the primary order manager 250-1. In accordance with the received commands, and orders 110-2, the inventory management resource 252-1 keeps track of the products and/or services purchased by each respective subscriber in network environment 100.

In one embodiment, network 192 is a cable network environment in which subscribers purchase products and/or services such as Internet access services, cable television services, phone services, hardware, communication devices, etc.

Inventory management resource 252-1 stores inventory information associated with the orders 110-2 (such as services and/or products purchased with respect to network elements 106) in repository 282-1.

As previously discussed, the primary order manager 250-1 is also in communication with the activation management resource 254-1. In accordance with input from the primary order manager 250-1, the activation management resource 254-1 manages activation of the services, products, etc., associated with the received orders 110-2.

In one embodiment, the activation management resource 254-1 executes any appropriate commands needed to activate services and/or products purchased by respective subscribers (operating network elements 106) as specified by the orders 110-2. The activation management resource 254-1 stores information (such as data INV2) associated with the activation in a respective data structure (such as database, file system, etc.) of repository 283-1.

In this manner, the management resource 240-1 manages orders 110-2 received from entity 120-2.

Note further that management system 130 includes resources to facilitate copying of respective backup data to back up storage resources (repository 184). For example, during operation, the synchronizer resource 156-1 associated with management system 130 stores a copy of data G1 in repository 180-1 as data G1-B in the repository 184; the synchronizer resource 156-1 retrieves a copy of data OM1 in repository 181-1 and stores it as data OM1-B in repository 184; the synchronizer resource 156-1 retrieves a copy of data INV1 in repository 182-1 and stores it as data INV1-B in repository 184; the synchronizer resource 156-1 retrieves a copy of data ACT1 from repository 183-1 and stores it as data ACT1-B in repository 184; etc.

Accordingly, management system 130-1 continuously stores a copy of backup data associated with management resource 140-1 in repository 184.

In a similar manner, management system 230 includes resources to facilitate copying of respective backup data to backup storage resources (repository 284). For example, the synchronizer resource 256-1 associated with management system 230 retrieves a copy of data G2 from repository 280-1 and stores it as data G2-B in the repository 284; the synchronizer resource 256-1 retrieves a copy of data OM2 from repository 281-1 and stores it as data OM2-B in repository 284; the synchronizer resource 256-1 retrieves a copy of data INV2 from repository 282-1 and stores it such as data INV2-B in repository 284; the synchronizer resource 256-1 retrieves a copy of data ACT2 from repository 283-1 and stores it as data ACT2-B in repository 284; etc.

Accordingly, management system 230-1 continuously stores a copy of backup data associated with management resource 240-1 in repository 284.

In accordance with further embodiments, as previously discussed, the management system 130 and the management system 230 are operable to provide data backup for each other. More specifically, in one embodiment, the management system 130 includes a primary repository (such as repository 180-1, 181-1, 182-1, 183-1, etc.) and an auxiliary repository (such as repository 280-2, 281-2, 282-2, 283-2, etc.).

Similarly, the management system 230 includes a primary repository (such as repository 280-1, 281-1, 282-1, 283-1, etc.) and an auxiliary repository (such as repository 180-2, 181-2, 182-2, 183-2, etc.).

Via communications between synchronizer resource 156-1 and synchronizer resource 156-2, the management system 130 retrieves a copy of data G1 from repository 180-1 and stores it as backup data G1-B in the repository 180-2; the synchronizer resource 156-1 retrieves a copy of data OM1 from repository 181-1 and stores it as backup data OM1-B in repository 181-2; the synchronizer resource 156-1 retrieves a copy of data INV1 from repository 182-1 and stores it as backup data INV1-B in repository 182-2; the synchronizer resource 156-1 retrieves a copy of data ACT1 from repository 183-1 and stores it as backup data ACT1-B in repository 183-2; etc.

Accordingly, management system 230 stores a copy of backup data associated with management resource 140-1 of management system 130.

Via communications between synchronizer resource 256-1 and synchronizer resource 256-2, the management system 230 retrieves a copy of data G2 from repository 280-2 and stores it as backup data G2-B in the repository 280-2; the synchronizer resource 156-1 retrieves a copy of data OM2 from repository 281-1 and stores it as backup data OM2-B in repository 281-2; the synchronizer resource 256-1 retrieves a copy of data INV2 from repository 282-1 and stores it as backup data INV2-B in repository 282-2; the synchronizer resource 256-1 retrieves a copy of data ACT2 from repository 283-1 and stores it as backup data ACT2-B in repository 283-2; etc.

Accordingly, management system 230 stores a copy of backup data associated with management resource 140-1.

In addition to storing a backup copy of order data (G2, OM2, INV2, ACT2), the auxiliary repository (184, 280-2, 281-2, 282-2, 283-2, etc.) of the first management system 130 is operable to store a backup copy of the order data (G1, OM1, INV1, ACT1).

In addition to storing a backup copy of order data (G1, OM1, INV1, ACT1), the auxiliary repository (284, 180-2, 181-2, 182-2, 183-2, etc.) of the second management system 230 is operable to store a backup copy of the order data (G2, OM2, INV2, ACT2).

Accordingly, the auxiliary repository of the first management system 130 stores a backup copy of its own data (such as G1, OM1, INV1, ACT1) as well as a backup of data (G2, OM2, INV2, ACT2) from the second management system 230; the auxiliary repository of the second management system 230 stores a backup copy of its own data (G2, OM2, INV2, ACT2) as well as a backup of data (G1, OM1, INV1, ACT1) from the first management system 130.

In accordance with yet further embodiments, each of the management system 130 and the management system 230 includes auxiliary resources to execute functions on behalf of the other management hardware/software in the event of a failure. For example, during conditions in which the management resource 240-1 experiences a failure and is unable to process the orders 110-2, the management system 130 switches the management resource 240-2 from a STANDBY mode to an ACTIVE mode to take over processing of orders 110-2 on behalf of failing management resource 240-1.

Additionally, in one embodiment, during conditions in which the management system 140-1 experiences a failure and is unable to process the orders 110-1, the management system 230 switches the management resource 140-2 from a STANDBY mode to an ACTIVE mode to take over processing of orders 110-1 on behalf of failing management resource 140-1.

Accordingly, occurrence of a disaster at a first geographical location in which the management resource 140-1 resides results in switchover to performing corresponding operations at a backup location (management resource 140-2 at a second geographical location).

Details of switchover and recovery operations are more particularly shown and discussed in the following figures.

Figure 3:
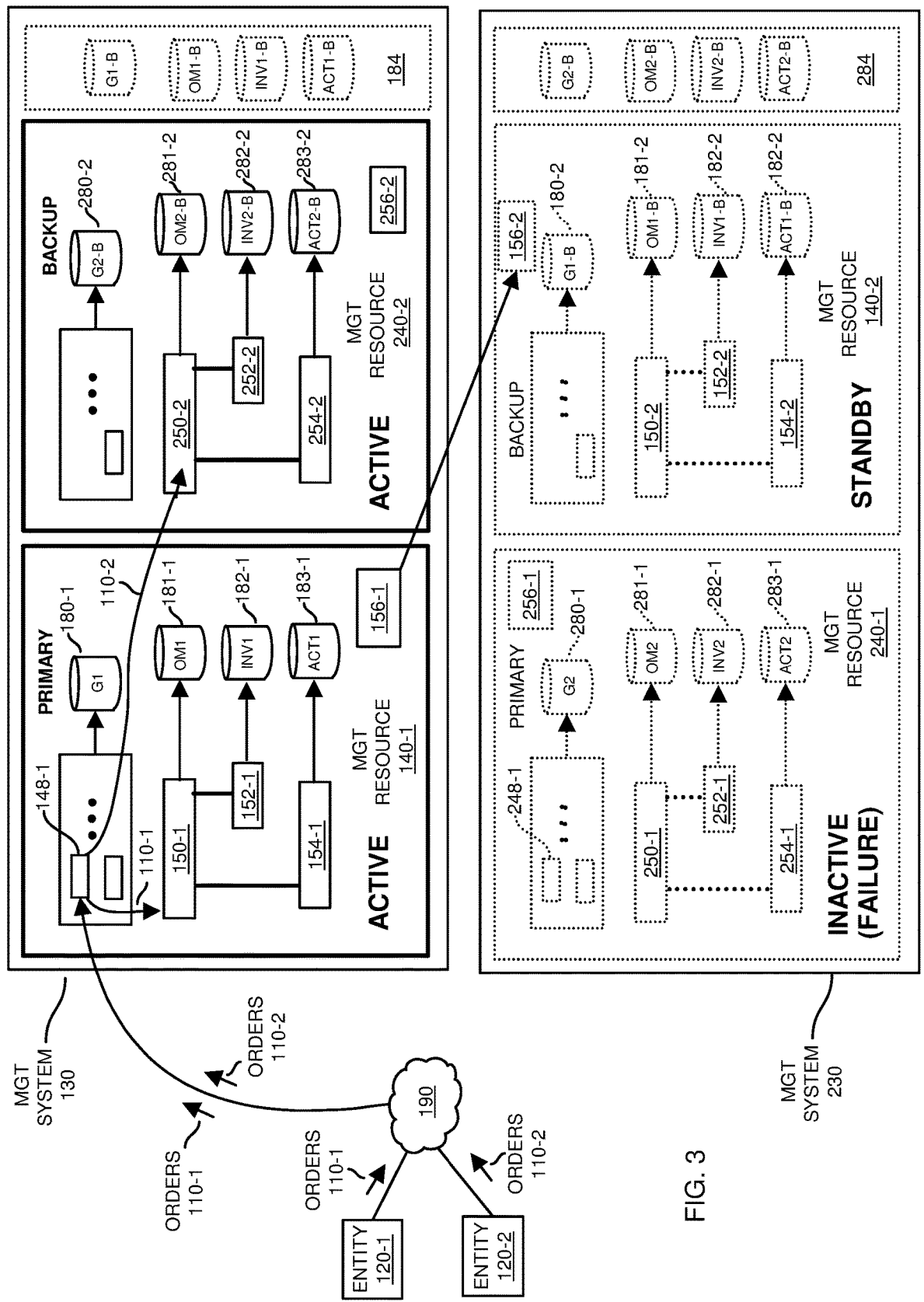
FIG. 3 is an example diagram illustrating details of a redundant order management system operating in a first backup operational mode according to embodiments herein.

FIG. 3 is an example diagram illustrating details of a redundant order management system operating in a first backup mode according to embodiments herein.

As shown, in the event that the management resource 240-1 (such as the primary order manager 250-1 or other resource) is unable to properly process the second orders 110-2, the order flow manager 148-1 reroutes the second orders to management resource 240-2 of management system 130.

More specifically, assume in this example that a function provided by the management resource 240-1 becomes disabled. In such an instance, the management system 230 switches from operating the management resource 240-1 from the ACTIVE mode to an INACTIVE mode. In response to detecting the failure condition associated with the management resource 240-1, the management system 130 switches the management resource 240-2 from a STANDBY mode to an ACTIVE mode to process respective orders 110-2. Additionally, the order flow manager 148-1 receives notification of the respective failure associated with the management resource 240-1 and that the management resource 240-2 is to be switched to the ACTIVE mode to handle orders 110-2.

In response the failure notification, instead of forwarding the second orders 110-2 to the primary order manager 250-1 of the management resource 240-1, the order flow manager 148-1 forwards the second orders 110-2 to the (auxiliary) primary order manager 250-2 of management resource 240-2 for processing. The management system 130 includes management resource 240-2 to execute the second orders 110-2 on behalf of the management system 230 during a failure condition of the management system 230.

In the ACTIVE mode, the primary order manager 250-2 performs operations previously performed by primary order manager 250-1 while management resource 240-1 was operated in the ACTIVE mode; repository 281-2 stores a backup copy of OM2 data up until a point of the failure associated with management resource 240-1. In the ACTIVE mode, the inventory management resource 252-2 performs operations previously performed by inventory management resource 252-1 while management resource 240-1 was operated in the ACTIVE mode; repository 282-2 stores a backup copy of INV2 data up until a point of the failure associated with management resource 240-1. In the ACTIVE mode, the activation management resource 254-2 performs operations previously performed by activation management resource 254-1 while management resource 240-1 was operated in the ACTIVE mode; repository 283-2 stores a backup copy of ACT2 data up until a point of the failure associated with management resource 240-1.

Accordingly, upon switching to the ACTIVE mode, the management resource 240-2 is able to seamlessly switchover to processing orders 110-2 on behalf of the failed (or INACTIVE) management resource 240-1.

Figure 4:
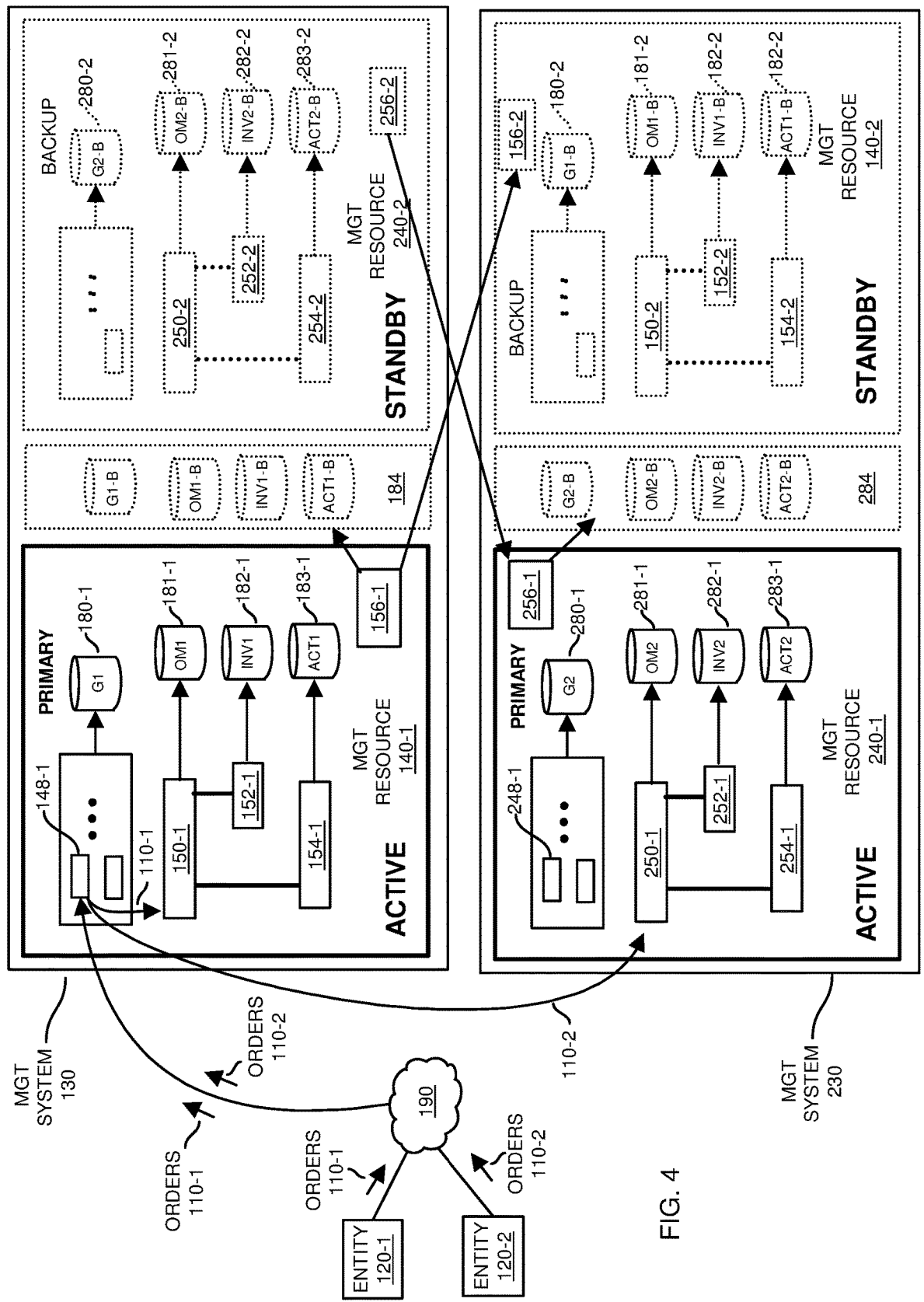
FIG. 4 is an example diagram illustrating details of a redundant order management system operating in a recovery mode according to embodiments herein.

FIG. 4 is an example diagram illustrating details of a redundant order management system operating in a recovery mode according to embodiments herein.

Assume in this example embodiment that the prior failure associated with the management resource 240-1 has been corrected. In such an instance, the management system 230 initiates switchover of operating the management resource 240-1 in the ACTIVE mode again. In one embodiment, switchover includes updating the respective repositories (280-1, 281-1, 282-1, 283-1, etc.) associated with management resource 240-1 with the up-to-date information stored in repositories (280-2, 281-2, 282-2, 283-2, etc.) of management resource 240-2.

More specifically, in order to switch back to normal operational mode in which the management resource 240-1 manages the orders 110-2, the synchronizer resource 256-2 communicates with synchronizer resource 256-1 to: convey a copy of data G2-B stored in repository 281-2 for storage in repository 280-1 as data G2; convey a copy of data OM2-B stored in repository 281-2 for storage in repository 281-1 as data OM2; convey a copy of data INV2-B stored in repository 282-2 for storage in repository 282-1 as data INV2; convey a copy of data ACT2-B stored in repository 283-2 for storage in repository 283-1 as data ACT2.

Accordingly, the synchronizer resource 256-1 and second synchronizer resource 256-2 are operable to copy the backup order data to the primary repositories of the management resource 240-1 in response to detecting that the management resource 240-1 becomes operable again after a failure.

Figure 5:
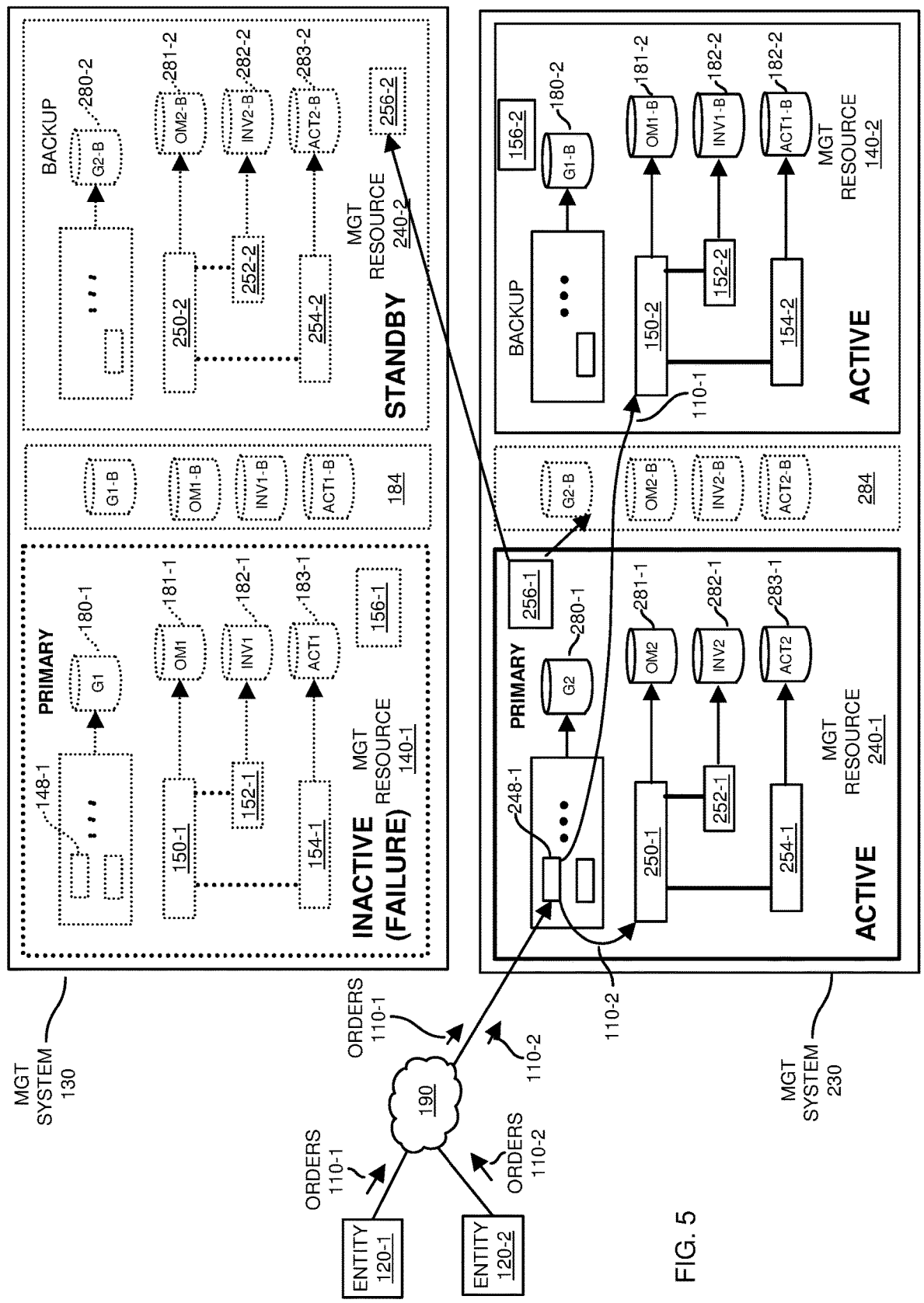
FIG. 5 is an example diagram illustrating details of a redundant order management system operating in a first backup mode according to embodiments herein.

FIG. 5 is an example diagram illustrating details of a redundant order management system operating in a first backup mode according to embodiments herein.

As shown, subsequent to operating both management resource 140-1 and management resource 240-1 in the ACTIVE mode again, in the event that the management resource 140-1 (such as the primary order manager 250-1 or other resource) becomes unable to properly process the first orders 110-1, the order flow manager 148-1 is no longer able to reroute orders 110. In such an instance, in response to detecting a failure associated management resource 140-1, the management resource 140-1 is set to an INACTIVE mode. The entities 120 are notified to no longer transmit respective orders 110 to the order flow manager 148-1. Instead, both the entity 120-1 and the entity 120-2 for the respective orders 110-1 and 110-2 to the order flow manager 248-1 (backup order flow manager) of management resource 240-1.

More specifically, assume in this example that the management resource 140-1 becomes disabled. In such an instance, the management system 130 switches from operating the management resource 140-1 from the ACTIVE mode to an INACTIVE mode.

In response to detecting the failure condition associated with the management resource 140-1, the management system 230 switches the management resource 140-2 from a STANDBY mode to an ACTIVE mode to take over processing respective orders 110-1. Additionally, the order flow manager 248-1 receives notification of the respective failure associated with the management resource 140-1 and that the management resource 140-2 has been switched to the ACTIVE state to handle orders 110-2. In response to receiving the notification, the order flow manager 248-1 forwards the second orders 110-2 to the primary order manager 250-1 for processing. The management system 230 operates management resource 140-2 to execute the first orders 110-1 on behalf of the management system 130 during a failure condition of the management system 130.

In the ACTIVE mode, the primary order manager 150-2 performs operations previously performed by primary order manager 150-1 while management resource 140-1 was operated in the ACTIVE mode; repository 181-2 stores a backup copy of OM1 data up until a point of the failure associated with management resource 140-1. In the ACTIVE mode, the inventory management resource 152-2 performs operations previously performed by inventory management resource 152-1 while management resource 140-1 was operated in the ACTIVE mode; repository 182-2 stores a backup copy of INV1 data up until a point of the failure associated with management resource 140-1. In the ACTIVE mode, the activation management resource 154-2 performs operations previously performed by activation management resource 154-1 while management resource 140-1 was operated in the ACTIVE mode; repository 183-2 stores a backup copy of ACT1 data up until a point of the failure associated with management resource 140-1.

Accordingly, the order flow manager 248-1 takes over forwarding orders 110. Additionally, the management resource 140-2 is able to seamlessly switchover to processing orders 110-1 on behalf of the failed (or INACTIVE) management resource 140-1.

Figure 6:
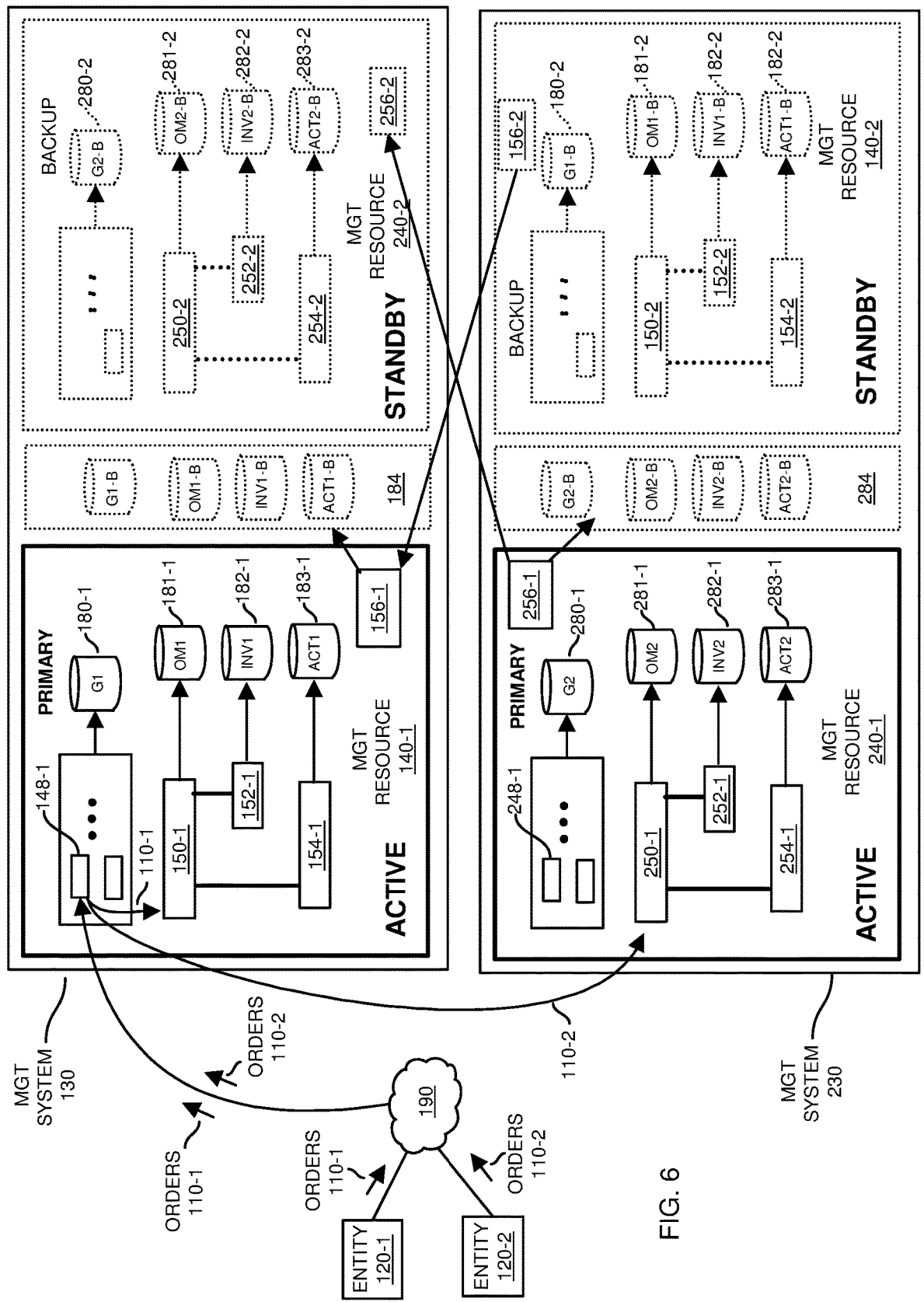
FIG. 6 is an example diagram illustrating details of a redundant order management system operating in a recovery mode according to embodiments herein.

FIG. 6 is an example diagram illustrating details of a redundant order management system operating in a recovery mode according to embodiments herein.

Assume in this example embodiment that the prior failure associated with the management resource 140-1 has been corrected. In such an instance, the management system 130 initiates switchover of operating the management resource 140-1 in the ACTIVE mode again. Switchover includes updating the respective repositories (180-1, 181-1, 182-1, 183-1, etc.) associated with management resource 140-1 with the up-to-date information stored in repositories (180-2, 181-2, 182-2, 183-2, etc.) of management resource 140-2.

More specifically, in order to switch back to a normal operational mode in which the management resource 140-1 manages the orders 110-1 again, the synchronizer resource 156-2 communicates with synchronizer resource 156-1 to: convey a copy of data G1-B retrieved from repository 181-2 for storage in repository 180-1 as data G1; convey a copy of data OM1-B retrieved from repository 181-2 for storage in repository 181-1 as data OM1; convey a copy of data INV1-B retrieved from repository 182-2 for storage in repository 182-1 as data INV2; convey a copy of data ACT1-B retrieved from repository 183-2 for storage in repository 183-1 as data ACT1.

Accordingly, the synchronizer resource 156-1 and second synchronizer resource 156-2 are operable to copy the backup order data to the primary repositories of the management resource 140-1 in response to detecting that the management resource 140-1 becomes operable again after a failure.

If desired, the entities 120 can be notified to forward the respective orders 110-1 and 110-2 to the order flow manager 148-1 again after management resource 140-1 is activated again. In such an instance, the order flow manager 148-1 forwards the respective orders 110 in a manner as previously discussed with respect to FIG. 2.

Figure 7:
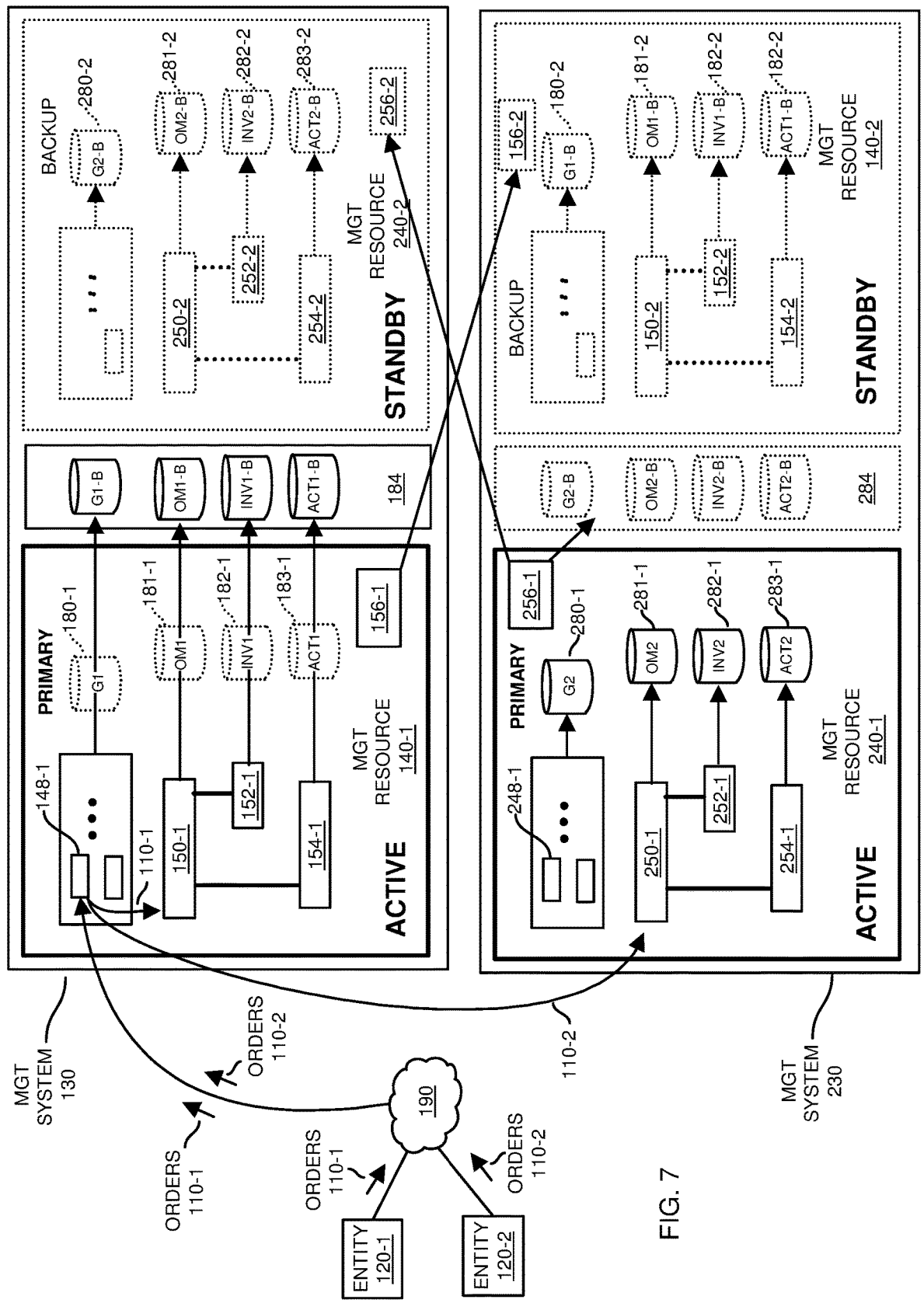
FIG. 7 is an example diagram illustrating details of a redundant order management system using a backup repository according to embodiments herein.

FIG. 7 is an example diagram illustrating details of a redundant order management system using backup repository according to embodiments herein.

As shown, one or more of repositories 180-1, 181-1, 182-1, 183-1, etc., associated with the management resource 140-1 may experience a respective failure condition. In such an instance, as shown, the respective resources (such as order flow manager 148-1, primary order manager 150-1, inventory management resource 152-1, and activation management resource 154-1) can be configured to use respective backup data stored in the auxiliary repository 184 to provide uninterrupted order management operation.

Figure 8:
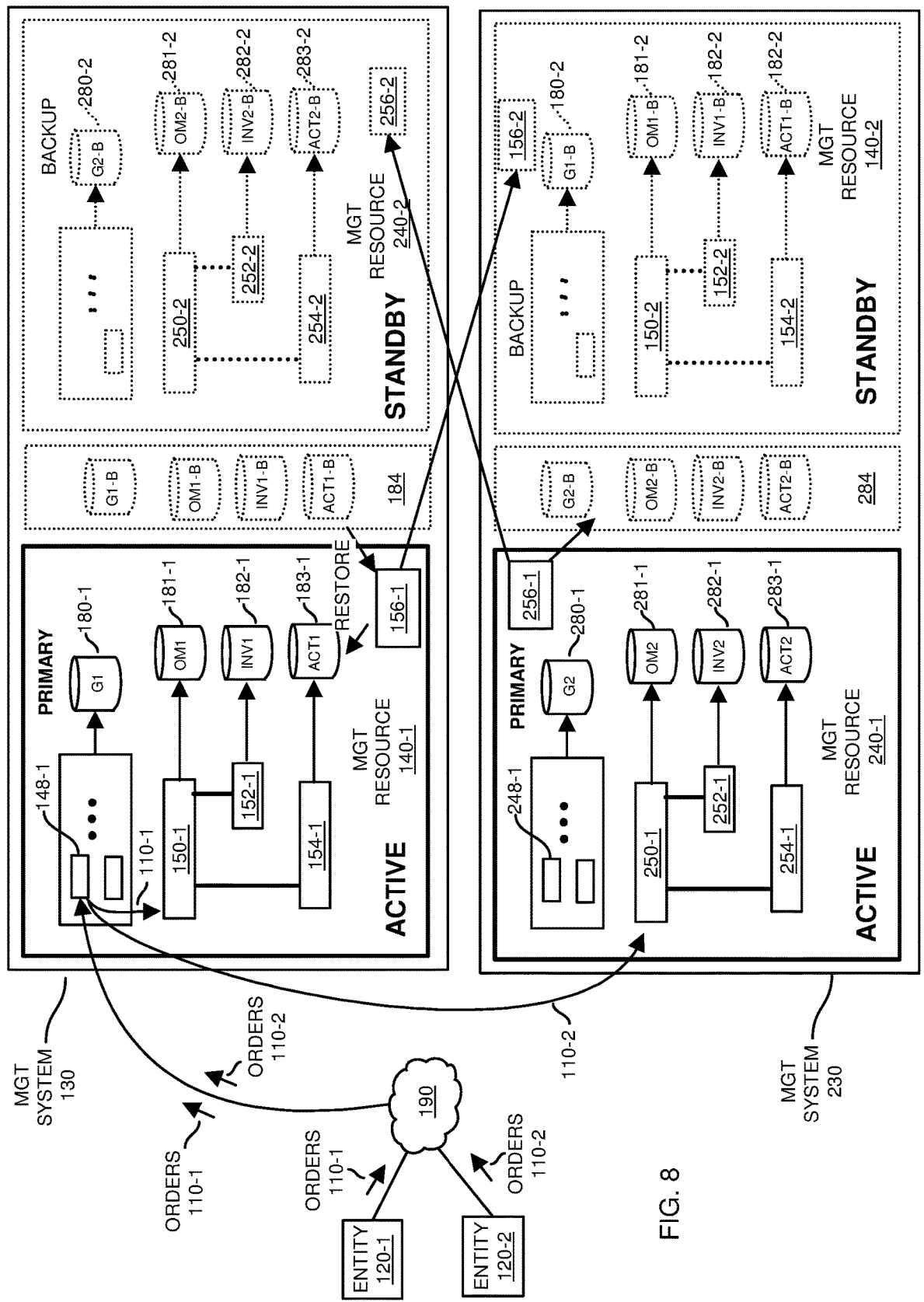
FIG. 8 is an example diagram illustrating details of a redundant order management system operating in a recovery mode according to embodiments herein.

FIG. 8 is an example diagram illustrating details of a redundant order management system operating in a recovery mode according to embodiments herein.

As shown, subsequent to repairing one or more of primary repositories 180-1, 181-1, 182-1, 183-1, etc., associated with the management resource 140-1, the synchronizer resource 156-1 initiates updating of the data stored in primary repositories 180-1, 181-1, 182-1, 183-1, etc. Accordingly, the corresponding resources associated with management resource 140-1 are able to operate again based on data stored in the primary repositories 180-1, 181-1, 182-1, 183-1, etc.

Figure 9:
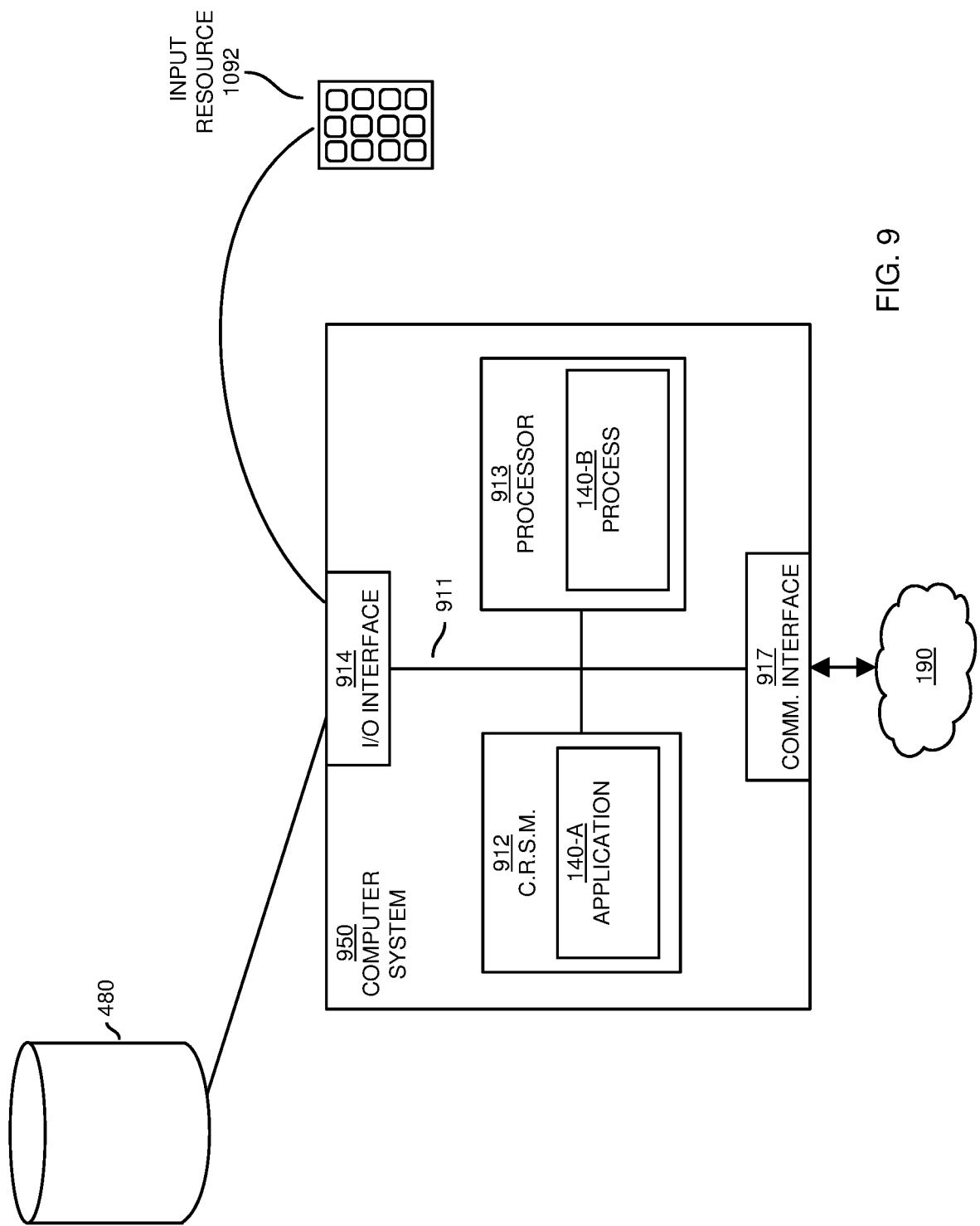
FIG. 9 is a diagram illustrating an example computer architecture to execute operations according to embodiments herein.

FIG. 9 is an example block diagram of a computer system for implementing any of the operations as discussed herein according to embodiments herein.

Any of the resources as discussed herein can be configured to include a processor (computer processor hardware) and executable instructions to carry out the different operations as discussed herein.

As shown, computer system 950 (such as a computer system) of the present example can include an interconnect 911 that couples computer readable storage media 912 such as a non-transitory type of media (i.e., any type of hardware storage medium) in which digital information can be stored and retrieved, a processor 913, I/O interface 914, and a communications interface 917.

I/O interface 914 supports connectivity to repository 480 and input resource 992.

Computer readable storage medium 912 can be any hardware storage device such as memory, optical storage, hard drive, floppy disk, etc. In one embodiment, the computer readable storage medium 912 stores instructions and/or data.

As shown, computer readable storage media 912 can be encoded with application 140-A (e.g., including instructions) to carry out any of the operations as discussed herein.

During operation of one embodiment, processor 913 accesses computer readable storage media 912 via the use of interconnect 911 in order to launch, run, execute, interpret or otherwise perform the instructions in application 140-A stored on computer readable storage medium 912. Execution of the application 140-A produces process 140-B to carry out any of the operations and/or processes as discussed herein.

Those skilled in the art will understand that the computer system 950 can include other processes and/or software and hardware components, such as an operating system that controls allocation and use of hardware resources to application 140-A.

In accordance with different embodiments, note that computer system may be or included in any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 950 may reside at any location or can be included in any suitable resource in any network environment to implement functionality as discussed herein.

Functionality supported by the different resources will now be discussed via the flowchart in FIG. 10. Note that the steps in the flowcharts below can be executed in any suitable order.

Figure 10:
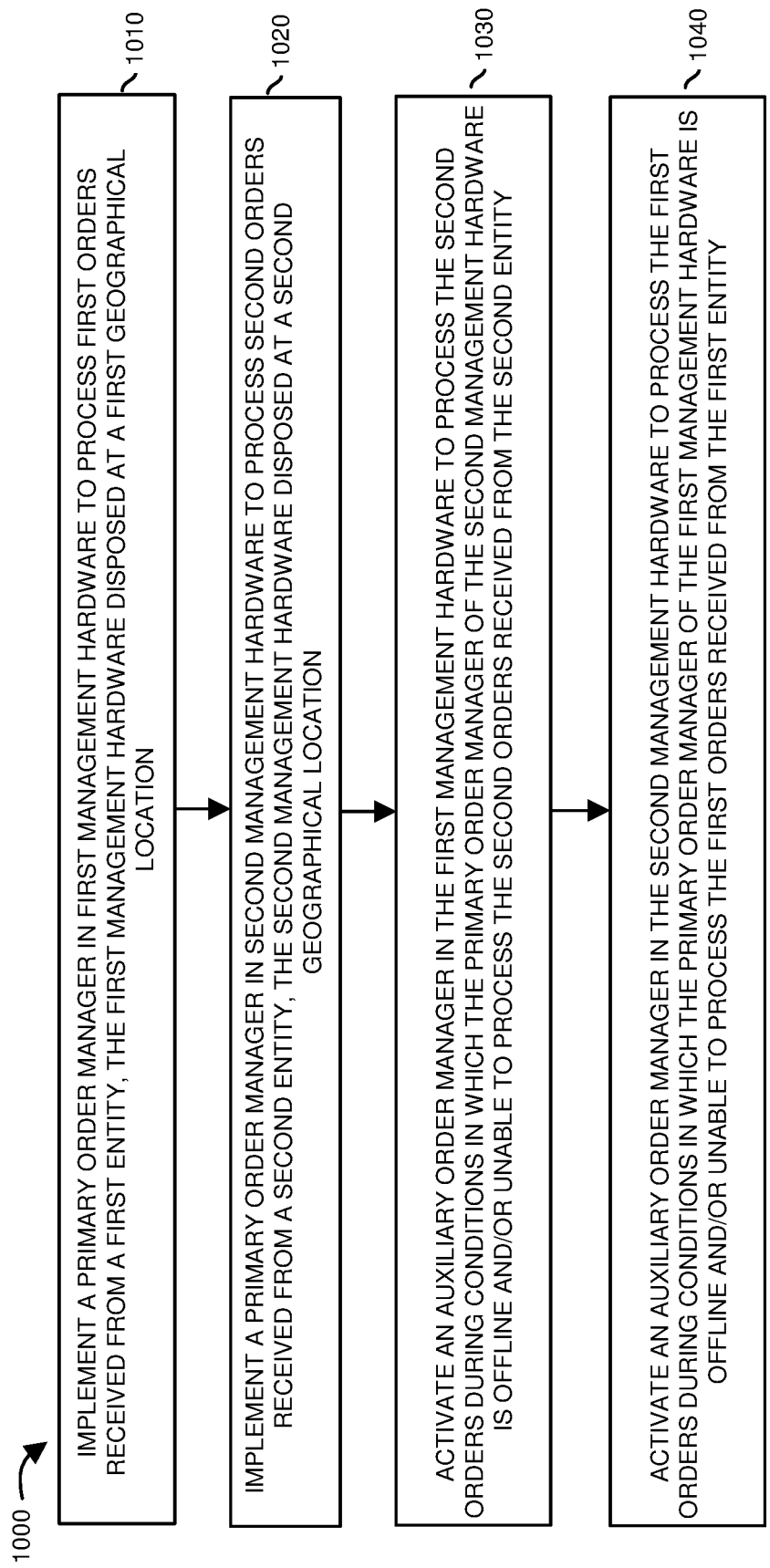
FIG. 10 is an example diagram illustrating a method according to embodiments herein.

FIG. 10 is a flowchart 1000 illustrating an example method according to embodiments. Note that there will be some overlap with respect to concepts as discussed above.

In processing operation 1010, the order management system 101 executes a primary order manager 150-1 in respective first management hardware/software (associated with management system 130) to process first orders 110-1 received from a first entity 120-1. The first management hardware is disposed at a first geographical location.

In processing operation 1020, the order management system 101 executes a primary order manager 250-1 in respective second management hardware/software (associated with management system 230) to process second orders 110-2 received from a second entity 120-2. The second management hardware/software is disposed at a second geographical location, which is disparately located with respect to the first geographical location.

In processing operation 1030, during conditions in which the primary order manager 250-1 or the second management hardware (management resource 240-1) is offline and unable to process the second orders 110-2 received from the second entity 120-2, the order management system 101 activates management resource 240-2 and auxiliary order manager 250-2 in the first management hardware/software of management system 130 to process the second orders. In such an instance, the order flow manager 148-1 forwards the second orders 110-2 to backup order manager 250-2 for processing.

In processing operation 1040, during conditions in which the primary order manager 150-1 or the first management hardware/software (management resource 140-1) is offline and unable to process the first orders 110-1 received from the second entity 120-1, the order management system 101 activates the management resource 140-2 and corresponding auxiliary order manager 150-2 in the second management hardware/software of management system 130 to process the first orders 110-1 instead of management resource 140-1. In such an instance, the order flow manager 248-1 receives the orders 110-1 and 110-2 and forwards the second orders 110-2 to backup order manager 150-2 for processing.

Note again that techniques herein are well suited to provide uninterrupted or nearly uninterrupted order management services. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A system comprising:

first management hardware including first primary hardware and first backup hardware, the first primary hardware including an order flow manager to route orders and a primary order manager to process first orders, the first management hardware disposed at a first geographical location;

second management hardware including second primary hardware and second backup hardware, the second primary hardware including an order flow manager to route orders and a primary order manager to process second orders, the second management hardware disposed at a second geographical location;

a synchronizer configured to synchronize storage of data between the first management hardware and the second management hardware; and wherein the first backup hardware is substantially a replica of the second primary hardware, and the second backup hardware is substantially a replica of the first primary hardware; and wherein during:

first conditions, the order flow manager of the first primary hardware is configured to: i) forward the first orders to the primary order manager of the first primary hardware for execution, and ii) forward the second orders to the primary order manager of the second primary hardware for execution, wherein the order flow manager of the second primary hardware is inactive during the first conditions; and second conditions, the order flow manager of the second primary hardware is configured to: i) forward the first orders to an auxiliary order manager of the second backup hardware for execution, and ii) forward the second orders to the primary order manager of the second primary hardware for execution, wherein the order flow manager of the first primary hardware is inactive during the second conditions.

2. The system as in claim 1, wherein the first primary hardware includes a first primary repository;
wherein the first backup hardware includes a first auxiliary repository;
wherein the second primary hardware includes a second primary repository;
wherein the second backup hardware includes a second auxiliary repository;
wherein the first auxiliary repository is operable to store a copy of order data stored in the second primary repository as first backup order data; and
wherein the second auxiliary repository is operable to store a copy of order data stored in the first primary repository as second backup order data.

3. The system as in claim 2 further comprising:
a first data synchronizer resource operable to copy an updated rendition of the first backup order data from the first auxiliary repository to the second primary repository in response to detecting that the second primary hardware becomes operable again after a failure; and
a second data synchronizer resource operable to copy an updated rendition of the second backup order data from the second auxiliary repository to the first primary repository in response to detecting that the first primary hardware becomes operable again after a failure.

4. The system as in claim 1, wherein the first management hardware includes a primary repository and an auxiliary repository;
wherein the second management hardware includes a primary repository and an auxiliary repository;
wherein the auxiliary repository of the first management hardware is operable to store: i) a copy of order data stored in the primary repository of the first management hardware, and ii) a copy of order data stored in the primary repository of the second management hardware; and
wherein the auxiliary repository of the second management hardware is operable to store: i) a copy of order data stored in the primary repository of the second management hardware, and ii) a copy of order data stored in the primary repository of the first management hardware.

5. The system as in claim 1, wherein the first orders are received from a first vendor; and
wherein the second orders are received from a second vendor.

6. The system as in claim 5, wherein the order flow manager of the first primary hardware is operative to:
forward the first orders and the second orders based on corresponding account information to which a respective order pertains.

7. The system as in claim 1, wherein the first management hardware includes a primary repository and an auxiliary repository;
wherein the second management hardware includes a primary repository and an auxiliary repository;
wherein the auxiliary repository of the first management hardware is operable to store a copy of order data stored in the primary repository of the second management hardware as first backup order data;
wherein the auxiliary repository of the second management hardware is operable to store a copy of order data stored in the primary repository of the first management hardware as second backup order data; and
wherein an auxiliary order manager of the first management hardware is operative to process the second orders using the first backup order data in the auxiliary repository of the first management hardware during third conditions in which the primary order manager of the second management hardware is unable to process the second orders.

8. The system as in claim 7, wherein the auxiliary order manager of the first management hardware stores data associated with processing of the second orders in the auxiliary repository of the first management hardware during the third conditions.

9. The system as in claim 8, wherein the first management hardware includes a first data synchronizer resource operative to communicate the first backup order data and the data associated with processing of the second orders to the primary repository of the second management hardware in response to detecting that the primary order manager of the second management hardware no longer experiences a failure.

10. The system as in claim 1, wherein the first conditions are non-fault conditions in which neither the first management hardware nor the second management hardware experiences a failure.

11. The system as in claim 10, wherein the second conditions are fault conditions in which the first management hardware experiences a failure and the second management hardware does not experience a failure.

12. The system as in claim 1, wherein the auxiliary order manager of the second backup hardware is substantially a replica of the primary order manager of the first primary hardware.

13. The system as in claim 1, wherein the first primary hardware and the second primary hardware operate in an active mode during the first conditions in which neither the first management hardware nor the second management hardware experiences a failure mode; and
wherein the first backup hardware and the second backup hardware operate in a standby mode during the first conditions.

14. The system as in claim 1, wherein the synchronizer is operative to, in response to switching from the second conditions back to the first conditions, copy and store order data generated by the second backup hardware as primary order data stored in the first primary hardware.

15. The system as in claim 1, wherein the synchronizer is operative to copy and store data generated by the first primary hardware as backup data in a repository of the second backup hardware during the first conditions.

16. A method comprising:
implementing first management hardware including first primary hardware and first backup hardware, the first primary hardware including an order flow manager to route orders and a primary order manager to process first orders, the first management hardware disposed at a first geographical location;
implementing second management hardware including second primary hardware and second backup hardware, the second primary hardware including an order flow manager to route orders and a primary order manager to process second orders, the second management hardware disposed at a second geographical location;
via a synchronizer, synchronizing storage of data between the first management hardware and the second management hardware; and wherein the first backup hardware is substantially a replica of the second primary hardware, and the second backup hardware is substantially a replica of the first primary hardware, the method further comprising:

during first conditions, via the order flow manager of the first primary hardware: i) forwarding the first orders to the primary order manager of the first primary hardware for execution, and ii) forwarding the second orders to the primary order manager of the second primary hardware for execution, wherein the order flow manager of the second primary hardware is inactive during the first conditions; and during second conditions, via the order flow manager of the second primary hardware: i) forwarding the first orders to an auxiliary order manager of the second backup hardware for execution, and ii) forwarding the second orders to the primary order manager of the second primary hardware for execution, wherein the order flow manager of the first primary hardware is inactive during the second conditions.

17. The method as in claim 16, wherein the first management hardware includes a primary repository and an auxiliary repository;

wherein the second management hardware includes a primary repository and an auxiliary repository, the method further comprising:

storing a copy of order data retrieved from the primary repository of the second management hardware in the auxiliary repository of the first management hardware as first backup order data; and storing a copy of order data retrieved from the primary repository of the first management hardware in the auxiliary repository of the second management hardware as second backup order data.

18. The method as in claim 17 further comprising:

copying the first backup order data from the auxiliary repository of the first management hardware to the primary repository of the second management hardware in response to detecting that the second management hardware becomes operable again after a first failure; and copying the second backup order data from the auxiliary repository of the second management hardware to the primary repository of the first management hardware in response to detecting that the first management hardware becomes operable again after a second failure.

19. The method as in claim 16 further comprising:

analyzing the first orders and the second orders;

forwarding the first orders to the primary order manager of the first management hardware for execution; and forwarding the second orders to the primary order manager of the second management hardware for execution.

20. The method as in claim 19, wherein the first orders are received from a first vendor; and wherein the second set of orders are received from a second vendor.

21. The method as in claim 20 further comprising:

forwarding the first orders and the second orders based on account information to which a respective order pertains.

22. The method as in claim 16, wherein the first orders are received from a first vendor; and wherein the second set of orders are received from a second vendor.

\* \* \* \* \*